(12) United States Patent
Raghavachari et al.

(10) Patent No.: US 12,075,248 B2
(45) Date of Patent: Aug. 27, 2024

(54) SYSTEMS AND METHODS FOR APPLICATION-ANONYMOUS SLICE SELECTION IN A WIRELESS NETWORK

(71) Applicant: Verizon Patent and Licensing Inc., Basking Ridge, NJ (US)

(72) Inventors: Balaji L. Raghavachari, Bridgewater, NJ (US); Lily Zhu, Parsippany, NJ (US); Bharadwaj Vemuri, Bear, DE (US); Miguel A. Carames, Long Valley, NJ (US); Brian T. Mecum, Aliso Viejo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 262 days.

(21) Appl. No.: 17/580,118

(22) Filed: Jan. 20, 2022

(65) Prior Publication Data

US 2023/0232229 A1   Jul. 20, 2023

(51) Int. Cl.
*H04W 12/08* (2021.01)
*H04L 43/16* (2022.01)
*H04L 45/302* (2022.01)

(52) U.S. Cl.
CPC ............ *H04W 12/08* (2013.01); *H04L 43/16* (2013.01); *H04L 45/306* (2013.01)

(58) Field of Classification Search
CPC ....... H04W 12/08; H04L 43/16; H04L 45/306
See application file for complete search history.

(56) References Cited

U.S. PATENT DOCUMENTS

| | | | |
|---|---|---|---|
| 10,785,652 B1* | 9/2020 | Ravindranath | H04W 12/48 |
| 2016/0134599 A1* | 5/2016 | Ross | H04L 63/0815 713/168 |
| 2022/0191028 A1* | 6/2022 | Aggarwal | H04L 9/3247 |
| 2023/0189115 A1* | 6/2023 | Shekhar | H04W 40/12 370/329 |
| 2023/0308277 A1* | 9/2023 | Van Cleve | H04W 12/02 |

* cited by examiner

*Primary Examiner* — Bryan Y Lee

(57) ABSTRACT

A system described herein may maintain information associating one or more tokens to one or more network slices associated with a network. The system may receive a request, from an application executing at a User Equipment ("UE"), for communication session information, where the request includes a particular token. The system may identify a particular network slice associated with the particular token based on the information associating the one or more tokens to the one or more network slices. The system may receive communication session information, associated with the particular network slice, from the network, and may provide the communication session information to the application. The application may use the communication session information to communicate with the network via the particular network slice. The application may use such communication session information without providing an application identifier to the network.

20 Claims, 11 Drawing Sheets

109

SYSTEMS AND METHODS FOR APPLICATION-ANONYMOUS SLICE SELECTION IN A WIRELESS NETWORK

BACKGROUND

Wireless networks may be used for the wireless transmission of various applications and/or types of traffic, such as voice call traffic, messaging traffic, audio and/or video streaming traffic, file download traffic, and/or other types of traffic. Different applications may have different Quality of Service ("QoS") requirements, routing rules, or the like. For example, voice call traffic may have lower latency requirements than file download traffic, and file download traffic may have higher throughput requirements than voice call traffic.

DETAILED DESCRIPTION OF EXAMPLE EMBODIMENTS

The following detailed description refers to the accompanying drawings. The same reference numbers in different drawings may identify the same or similar elements.

Embodiments described herein provide for application client-initiated network communications via a particular network slice, in a manner that preserves anonymity of the application. As such, the privacy of users may be preserved, as data pertaining to the usage of particular applications, traffic types, etc. by a given user need not be provided to a network in order for such applications, traffic types, etc. to be handled properly (e.g., to provide Quality of Service ("QoS") treatment, implement routing rules, Service Level Agreements ("SLAs"), etc.) by the network, in accordance with embodiments described herein.

A "network slice" may refer to a discrete set of resources, devices, systems, Virtualized Network Functions ("VNFs"), Cloud-Native Network Functions ("CNFs"), etc. associated with a network, where different slices provide differentiated levels of service. In some embodiments, different slices may include or represent different logical networks resulting in differentiated levels of service. Additionally, or alternatively, a network slice may refer to a set of rules and/or policies, such as routing rules, queuing weights and/or policies, QoS policies, SLAs, etc. to apply to network traffic associated with a given network slice. For example, one particular slice may provide relatively low latency communications and relatively low throughput, another slice may provide relatively high latency communications and relatively high throughput, yet another slice may provide relatively low latency communications and relatively high throughput, and so on. While the following description is provided in the context of communication sessions being provided via particular network slices, the same or similar concepts may be applied to other types of communication sessions, routing techniques, traffic processing techniques, etc. that are implemented in order to provide differentiated levels of service to traffic associated with particular applications, as described herein. For example, some networks may not implement network slicing, and/or may provide differentiated service in some manner other than network slicing.

Figure 1:
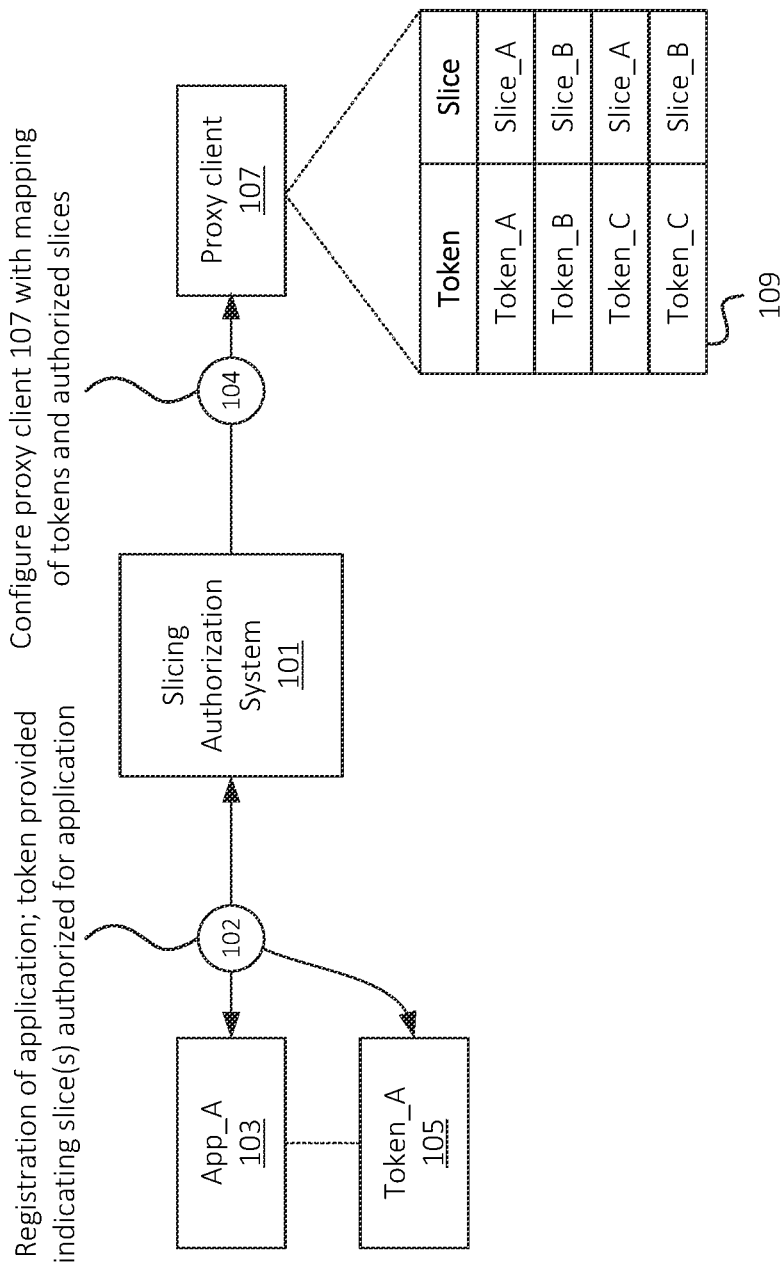
FIG. 1 illustrates an example configuration of a proxy client with information associating particular application tokens with particular network slices, in accordance with one or more embodiments described herein.

As shown in FIG. 1, Slicing Authorization System ("SAS") 101 may receive (at 102) registration information associated with a particular application 103 (i.e., "App_A," in this example) that is executable at one or more UEs and/or is otherwise associated with one or more client applications that are executable at one or more UEs. Application 103 may be or may include, for example, a web browser application, a content streaming application, a videoconferencing application, an augmented reality application, a gaming application, and/or some other type of application. The registration information may include an identifier of application 103, such as a name, a unique code, a hash value, etc. In some embodiments, the registration information may include token 105. Token 105 may have been granted by one or more devices or systems associated with a particular network (e.g., a wireless network), and may indicate that application 103 is authorized to access one or more network slices associated with the network. For example, as discussed below, token 105 may be used in order for the network to control access by application 103 to particular network slices or other traffic parameters, without the need for the network to determine the identity of application 103.

SAS 101 may receive (at 102) the registration information from a developer or other provider associated with application 103, an "app store," an application repository, or some other source. In some embodiments, token 105 may be stored with application 103 and/or may be embedded in application 103. In some embodiments, SAS 101 may implement an application programming interface ("API") via which application 103 and token 105 may be received in conjunction with each other. In some embodiments, token 105 may be embedded in application 103. In such embodiments, SAS 101 may extract token 105 from application 103, and/or application 103 may implement an API or other communication pathway via which application 103 may provide token 105 to SAS 101. In some embodiments, SAS 101 may participate in an authentication and/or authorization validation procedure, in which authorization for application 103 to access one or more particular network slices is verified, and in which application 103 is associated with token 105 indicating such authorization. In some embodiments, SAS 101 may receive token 105 without receiving an identifier of application 103 and/or some other indication that application 103 is associated with token 105. For example, application 103 may have been associated with token 105 by some other device or system, and SAS 101 may receive token 105 from such other device or system.

In some embodiments, SAS 101 and/or some other device or system may indicate (e.g., via an API or some other suitable communication pathway) to application 103 one or more network slices for which application 103 is authorized. For example, application 103 may receive an indication of which network slice(s) application 103 has been authorized to access. Additionally, or alternatively, application 103 may receive an indication of particular traffic attributes or descriptors, performance thresholds (e.g., minimum throughput, maximum latency, etc.), or other traffic parameters that application 103 has been authorized to access. In this sense, application 103 may be "aware" of which network slice(s), traffic attributes, performance thresholds, etc. application 103 is authorized to access, based on which application 103 may request such access, as discussed below.

SAS 101 may also configure proxy client 107 with a mapping of particular tokens 105 to particular network slices. Proxy client 107 may be or may be implemented by, for example, an application that is installed on one or more UEs and/or may be available for installation on one or more UEs. In some embodiments, proxy client 107 may be "pre-loaded" on one or more UEs, may be provided via an over-the-air update procedure, may be provided via an "app store," may be implemented as part of UE firmware, and/or may otherwise by executed or executable by one or more UEs. SAS 101 and/or proxy client 107 may implement one or more APIs or other communication pathways via which SAS 101 and one or more instances of proxy client 107 may communicate (e.g., via which proxy client 107 may receive (at 104) information mapping particular tokens to particular network slices).

As shown, such mapping information may be maintained by proxy client 107 in data structure 109 and/or in some other suitable format. In this example, a first token ("Token_A") may be associated with a first network slice ("Slice_A"), and a second token ("Token_B") may be associated with a second network slice ("Slice_B"). As further shown, a third token ("Token_C") may be associated with the first and second network slices. That is, one token may be associated with multiple network slices, and/or the same network slice may be associated with multiple tokens. As referred to herein, a token being "associated with" a particular network slice indicates that applications that include and/or make use of such token are authorized for the particular network slice.

In some embodiments, SAS 101 may provide (at 104) the mapping information to some or all instances of proxy client 107 that are installed or are executing at one or more UEs (e.g., may "push" or otherwise provide such information to such instances of proxy client 107). In some embodiments, SAS 101 may periodically provide such mapping information (e.g., on a scheduled basis), may provide such mapping information when receiving updates to the information (e.g., upon registering a particular application for a particular slice or receiving an indication that the particular application has been authorized for the particular slice), and/or on some other basis.

Figure 2:
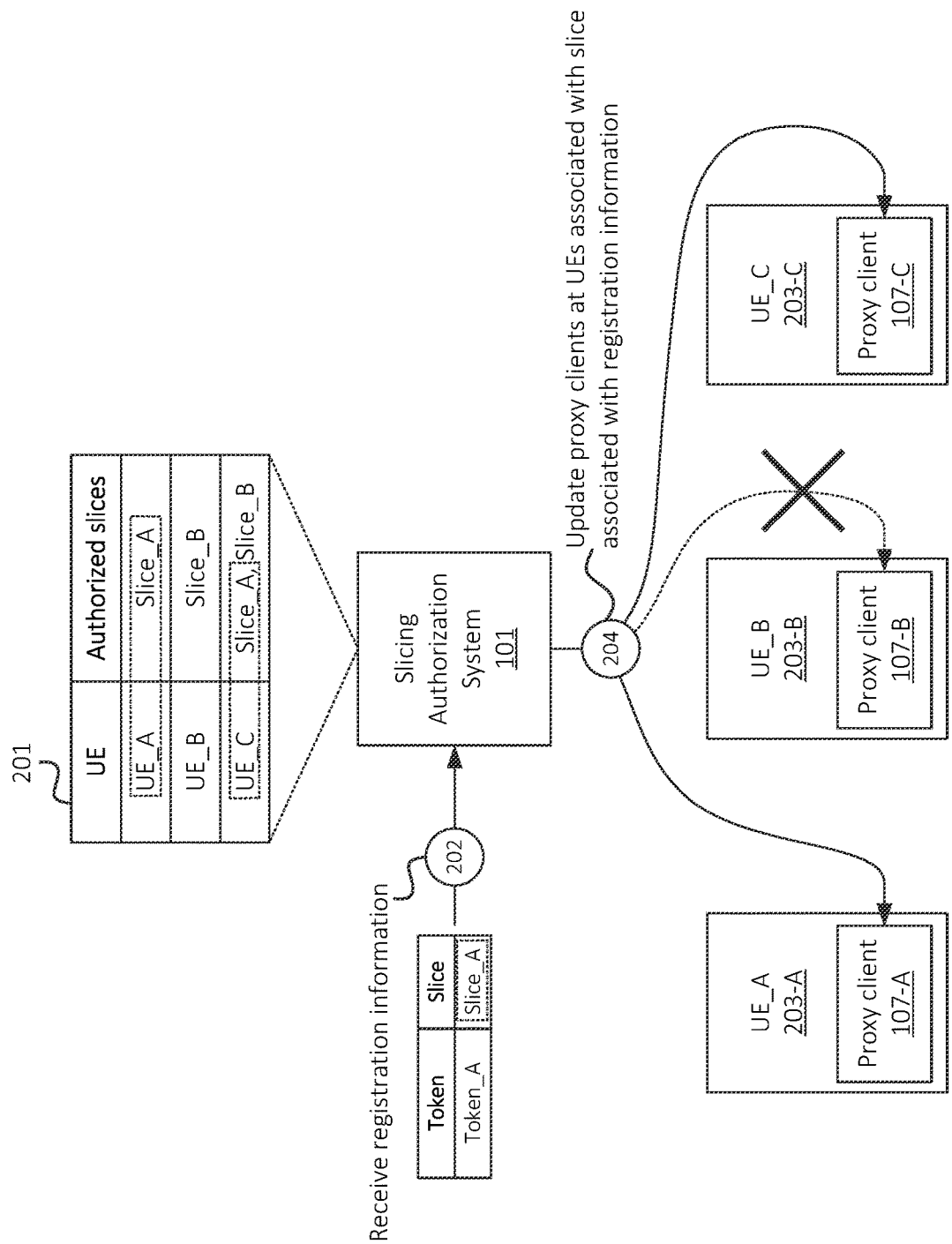
FIG. 2 illustrates an example updating of proxy clients associated with User Equipment ("UEs") that are authorized to access one or more network slices, in accordance with one or more embodiments described herein.

As shown in FIG. 2, SAS 101 may update only some instances of proxy client 107 based on receiving information associating a given token with a particular network slice. For example, SAS 101 may receive (at 202) registration information, associating a particular token ("Token_A," in this example) with a particular network slice ("Slice_A," in this example). SAS 101 may further maintain, receive, access, etc. information (e.g., represented in the figure by data structure 201) associating one or more UEs 203 with one or more network slices. For example, SAS 101 may receive such information from a Unified Data Management function ("UDM") associated with a wireless network, a Home Subscriber Server ("HSS") associated with a wireless network, an Authentication, Authorization, Accounting ("AAA") server, and/or some other suitable source. In some embodiments, SAS 101 may receive such information via a Network Exposure Function ("NEF"), a Service Capability Exposure Function ("SCEF"), or some other suitable device, system, or interface. In some embodiments, data structure 201 may include one or more UE identifiers, such as a Subscription Permanent Identifier ("SUPI"), a Globally Unique Temporary Identifier ("GUTI"), an International Mobile Station Equipment Identity (WEI"), an International Mobile Subscriber Identity ("IMSI"), a Media Access Control ("MAC") address, and/or some other suitable identifier.

The received (at 202) registration information may be, may include, and/or may be a portion of data structure 109 discussed above. In this example, such registration information indicates that Token_A is associated with Slice_A (e.g., applications that include or are otherwise associated with Token_A are authorized to access Slice_A). Further, data structure 201 may indicate that UEs 203-A and 203-C (also referred to in the figure as "UE_A" and "UE_C," respectively) are authorized to access Slice_A, and that UE 203-B is not authorized to access Slice_A. Based on determining that UEs 203-A and 203-C are authorized to access Slice_A, and further based on determining that UE 203-B is not authorized to access Slice_A, SAS 101 may update (at 204) instances of proxy client 107 associated with (e.g., installed on, executed by, etc.) UEs 203-A and 203-C without updating an instance of proxy client 107 associated with UE 203-B. In this manner, UEs that are not authorized for particular slices may not be updated with information mapping tokens to such slices, thus saving network resources or other resources that would be consumed by such updating.

The update (at 204) may include an over-the-air update, a "push" update, a notification that an update is available, etc. Once the update is received by proxy client 107-A and proxy client 107-C (e.g., instances of proxy client 107 associated with UEs 203-A and 203-C, respectively), proxy client 107-A and proxy client 107-C may update information (e.g., stored in data structure 109 or some other suitable data structure) associating Token_A with Slice_A. As discussed below, such association may facilitate the providing of network access, via Slice_A, to applications that have been authorized to access Slice_A, without requiring such applications to provide identifying information for such applications.

Figure 3:
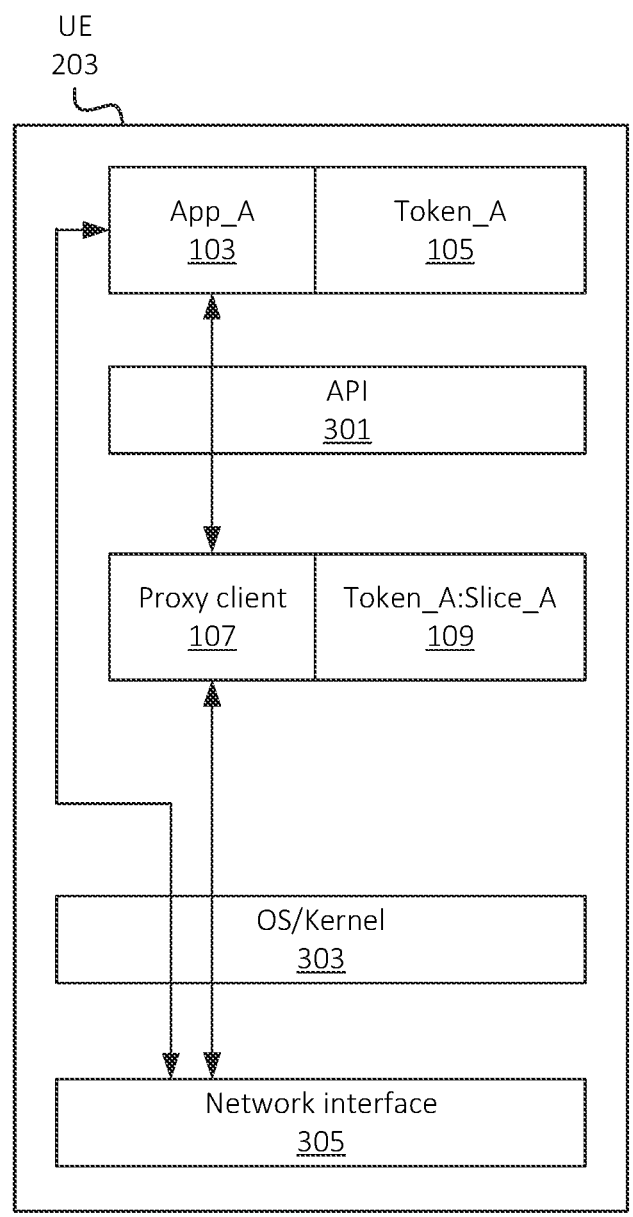
FIG. 3 illustrates example components of a UE, in accordance with one or more embodiments described herein.

FIG. 3 illustrates example components of UE 203, in accordance with some embodiments. As shown, UE 203 may include application 103, which may be installed, pre-loaded, received from an "app store," etc. As noted above, application 103 may include token 105, which may be embedded within application 103, included in application resource files (e.g., which may be installed on UE 203 as part of an application installation procedure), etc. UE 203 may also include proxy client 107 which, as discussed above, may be installed, pre-loaded, received from an "app store," etc. Proxy client 107 may also include and/or may be associated with data structure 109, mapping one or more tokens to one or more respective network slices.

Application 103 and proxy client 107 may communicate via API 301. For example, application 103 and proxy client 107 may implement API 301 and/or one or more other communicate pathways via which application 103 and proxy client 107 communicate, where such communications are discussed in more detail below. Briefly, application 103 may communicate with proxy client 107 via API 301 to request access to a particular network slice, and proxy client 107 may respond via API 301 with information that may be used by application 103 to communicate with a network via the requested network slice.

UE 203 may also include operating system ("OS")/kernel 303 and network interface 305. OS/kernel 303 may provide access to processor resources, network resources (e.g., including network interface 305), memory resources, storage resources, and/or other resources of UE 203 to application 103 and/or to proxy client 107. In some embodiments, OS/kernel 303 may provide a suitable permission level, pass-through access, etc. to application 103 and/or proxy client 107 to perform one or more operations described herein (e.g., to communicate with one or more networks via network interface 305).

Network interface 305 may facilitate communications between UE 203 (e.g., communications associated with application 103, proxy client 107, and/or other components of UE 203) and one or more networks, such as a wireless network. As discussed below, network interface 305 may receive requests to establish communication sessions (e.g., protocol data unit ("PDU") sessions and/or other types of sessions) between UE 203 and one or more networks. Such requests may include traffic descriptors, a request for a particular network slice, a request for a communication session that meets particular parameters or thresholds (e.g., performance and/or Quality of Service ("QoS") thresholds), and/or some other type of suitable information. In some embodiments, network interface 305 may receive or maintain UE Route Selection Policy ("URSP") rules or other suitable information that maps parameters of such requests to network slices, PDU sessions, Data Network Names ("DNNs"), and/or other types of information that may be used to communicate with one or more networks according to one or more requested network slices or other types of communications with differentiated levels of service, performance, etc.

Figure 4:
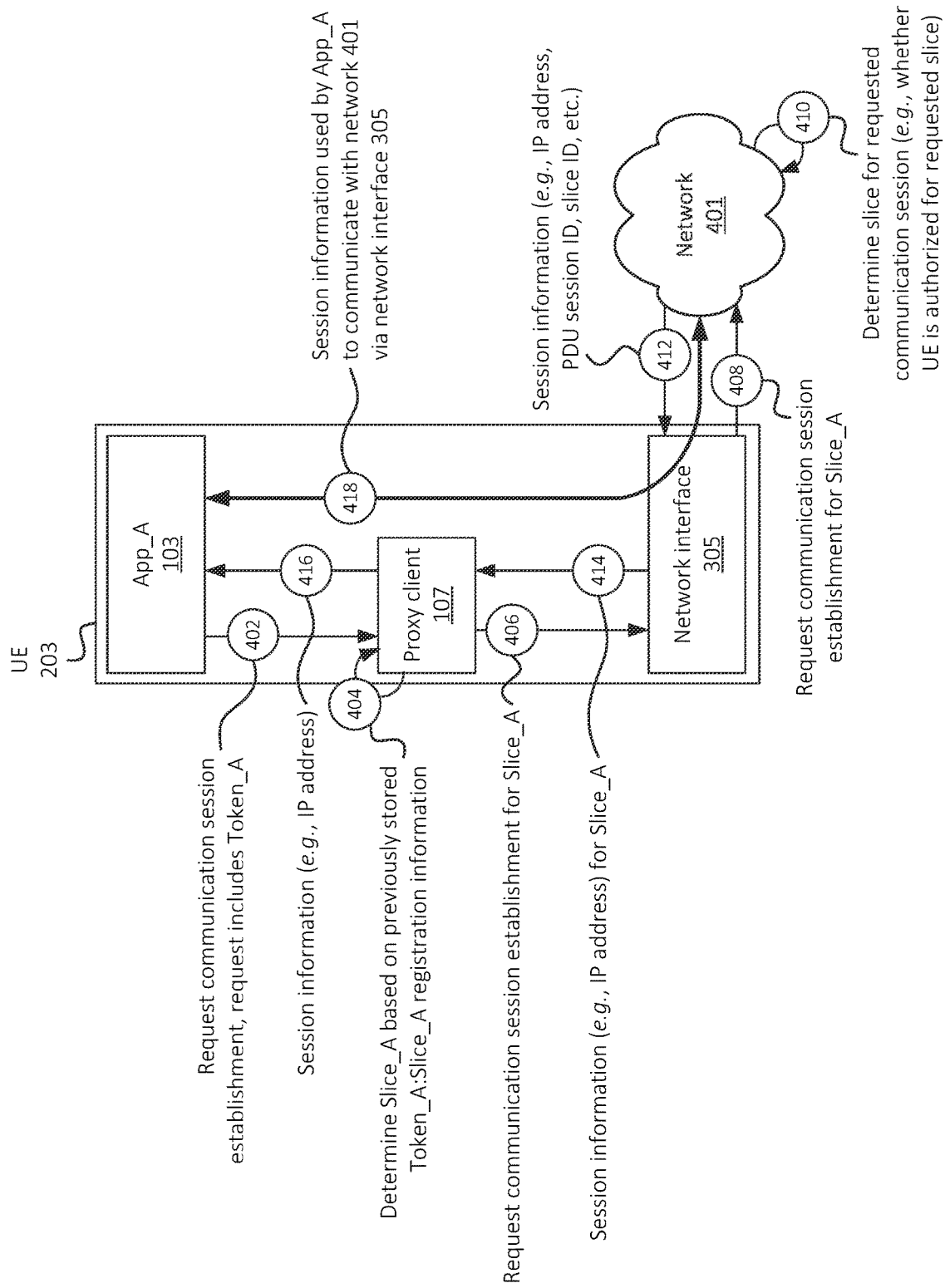
FIGS. 4 and 5 illustrate example signal flows to establish communications according to a particular network slice for traffic associated with a particular application without providing an application identifier to the network, in accordance with one or more embodiments described herein.

As shown in FIG. 4, for example, a particular application 103 (i.e., App_A in this example) may request (at 402) a communication session associated with a particular network slice (i.e., Slice_A, in this example). As such, the request may include a token associated with the particular slice (i.e., Token_A, in this example). For example, as noted above, application 103 may maintain information indicating that application 103 is authorized for the particular slice, and may further maintain information indicating that the particular token is associated with the particular slice. In some embodiments, application 103 may have presented a selectable option or may have otherwise indicated to a user of UE 203 that the particular network slice is available. Such indication may indicate performance parameters associated with the particular network slice (e.g., a minimum throughput, a maximum latency, etc.), a name or label associated with the particular network slice (e.g., "boosted performance," "lower latency," etc.), and/or may otherwise indicate the option to receive differentiated service for application 103. As such, application 103 need not specifically indicate a particular network slice, DNN, PDU session, URSP rule, etc. when indicating availability of differentiated services to the user. In some embodiments, application 103 may output (at 402) the request based on receiving a user selection of a particular level of service, name or label associated with a particular network slice, etc. Additionally, or alternatively, application 103 may make such request without receiving user input from a user of UE 203.

In situations where application 103 is authorized for multiple different network slices, application 103 may include the particular token associated with the particular selected network slice. For example, assume application 103 is authorized to access Slice_A and Slice_B, and that a user of UE 203 has selected to utilize Slice_A (e.g., has selected an option for a level of service provided via Slice_A). Application 103 may maintain Token_A associated with Slice_A, and may further maintain Token_B associated with Slice_B. Based on the selection of Slice_A, application 103 may provide (at 402) Token_A (e.g., without providing Token_B) to proxy client 107 when requesting service via Slice_A.

Proxy client 107 may determine (at 404) that the request (at 402) is associated with Slice_A based on the previously stored (e.g., received at 104 and/or 204) information associating Token_A with Slice_A. In this manner, proxy client 107 need not receive an application identifier associated with application 103 in order to provide communication session information to application 103, as the token has previously been authenticated by one or more network devices, as mentioned above. In this manner, the anonymity of application 103 may be maintained, thus protecting the privacy of the user of UE 203, inasmuch as the identity of application 103 is not revealed to the network and/or to one or more other devices or systems.

In some embodiments, proxy client 107 may authenticate the request by authenticating the received token. For example, proxy client 107 may communicate with SAS 101 and/or some other device or system, and/or may perform some suitable authentication technique, in order to authenticate the received token. In this manner, proxy client 107 may deny or may not respond to requests including malicious, outdated, or otherwise invalid tokens. For example, in some instances, as discussed below, authorization to use a particular slice may be revoked for a given token, where proxy client 107 may receive an indication of such revocation without application 103 necessarily receiving an indication of the revocation.

Proxy client 107 may output (at 406) a request to network interface 305, requesting communication session information via the requested slice. For example, proxy client 107 may request that such communication session be established, or that information for an existing communication session via the requested slice be provided to proxy client 107. In this example, assume that such communication session has not been previously established.

The request (at 406) may include a traffic descriptor, a request for particular performance requirements (e.g., a maximum latency, a minimum throughput, etc.), desired or expected performance metrics, a request for a particular network slice, and/or other parameters associated with the received (at 402) token. For example, in some embodiments, the request (at 406) may not necessarily include a slice identifier. In such embodiments, network interface 305 may identify and/or assign a network slice based on parameters included in the request (at 406). For example, the request may specify performance thresholds such as minimum throughput, maximum latency, a label (e.g., "first responder," "gaming," "boosted performance," etc.), a traffic descriptor, or some other parameters. Network interface 305 may identify a particular network slice based on the request based on URSP rules and/or some other type of information or function based on which a network slice may be identified based on the requested parameters. On the other hand, in some embodiments, the request (at 406) may include a slice identifier or some other indication of a requested network slice. In some embodiments, network interface 305 may determine, and/or the request may include an identifier of, some other type of communication session parameters in addition to, or in lieu of, a particular network slice. For example, such communication session parameters may include a DNN, a PDU session, etc.

Network interface 305 may request (at 408) a communication session establishment based on the identified slice or other parameters (e.g., DNN, PDU session, etc.). For example, network interface 305 may communicate with one or more elements of network 401, such as an Access and Mobility Management Function ("AMF"), a Mobility Management Entity ("MME"), a Session Management Function ("SMF"), a Serving Gateway ("SGW"), SAS 101, and/or some other device or system of network 401 that facilitates the establishment of communication sessions with UEs. The communication session request (at 408) may include a request for a particular network slice, such as the network slice determined by network interface 305, proxy client 107, and/or requested by application 103. In some embodiments, the request (at 408) may include one or more identifiers associated with UE 203, such as a SUPI, a GUTI, an IMEI value, an IMSI value, a MAC address, and/or some other suitable identifier.

One or more devices or systems of network 401 (e.g., an AMF, an MME, etc. of network 401) may determine (at 410) an appropriate network slice based on the request (at 408). For example, such one or more devices or systems of network 401 may determine whether UE 203 is authorized to access the requested network slice based on information maintained in an information repository associated with network 401, such as a UDM, an HSS, etc. (e.g., similar to the information described above with respect to data structure 201). For example, such devices or systems network 401 may compare one or more UE identifiers (e.g., as stored in data structure 201) to the one or more UE identifiers included in the request (at 408), and may determine whether the UE identifier(s) in the request match any of the UE identifiers, included in data structure 201, that are associated with the requested network slice.

In the event that UE 203 is authorized to access the requested network slice, network 401 may respond (at 412) with session information associated with the requested network slice. For example, network 401 may establish a PDU session and/or some other type of communication session, via the requested network slice, associated with a User Plane Function ("UPF"), a PDN Gateway ("PGW"), and/or some other device or system that provides user plane traffic services. On the other hand, if network 401 determines that UE 203 is not authorized for the requested slice, network 401 may deny the communication session request, and/or may establish a communication session associated with a different network slice than requested (e.g., a "default" slice or some other slice).

The response (at 412) may include information regarding the established communication session, such as a PDU session identifier, a slice identifier (e.g., a Network Slice Selection Assistance Information ("NSSAI") value or some other identifier), a DNN, one or more Internet Protocol ("IP") addresses (e.g., an IP address associated with UPF or other network device of network 401 and/or an IP address assigned to UE 203 for communications via the particular network slice), an indication of a granted QoS configuration parameters, or some other information regarding the communication session. Network interface 305 may forward (at 414) some or all of the session information to proxy client 107. For example, network interface 305 may provide an IP address assigned by network 401, for communications associated with UE 203 via the particular network slice, to proxy client 107. In some embodiments, UE 203 may be associated with multiple IP addresses, communication sessions, etc., such as in situations where different applications 103 communicate via different network slices, and/or in situations where a particular application 103 is associated with different network slices for different types or categories of traffic (e.g., a particular application 103 may be associated with voice traffic, video traffic, file transfer traffic, etc.).

Proxy client 107 may further provide (at 416) the communication session information, such as an IP address assigned by network 401, to application 103. Once application 103 receives (at 416) the communication session information, application 103 may communicate (at 418) with network 401, via network interface 305, using such communication session information. For example, application 103 may set a "source" of application traffic to the received IP address, and/or may otherwise utilize the communication session information, and may output application traffic to network 401 via network interface 305 using such IP address and/or other communication session information. Similarly, network interface 305 may provide application traffic, destined for the IP address and/or otherwise received via the established communication session, to application 103. In this manner, application 103 may receive network services via the particular slice without revealing, to network 401, an identifier of application 103.

Figure 5:
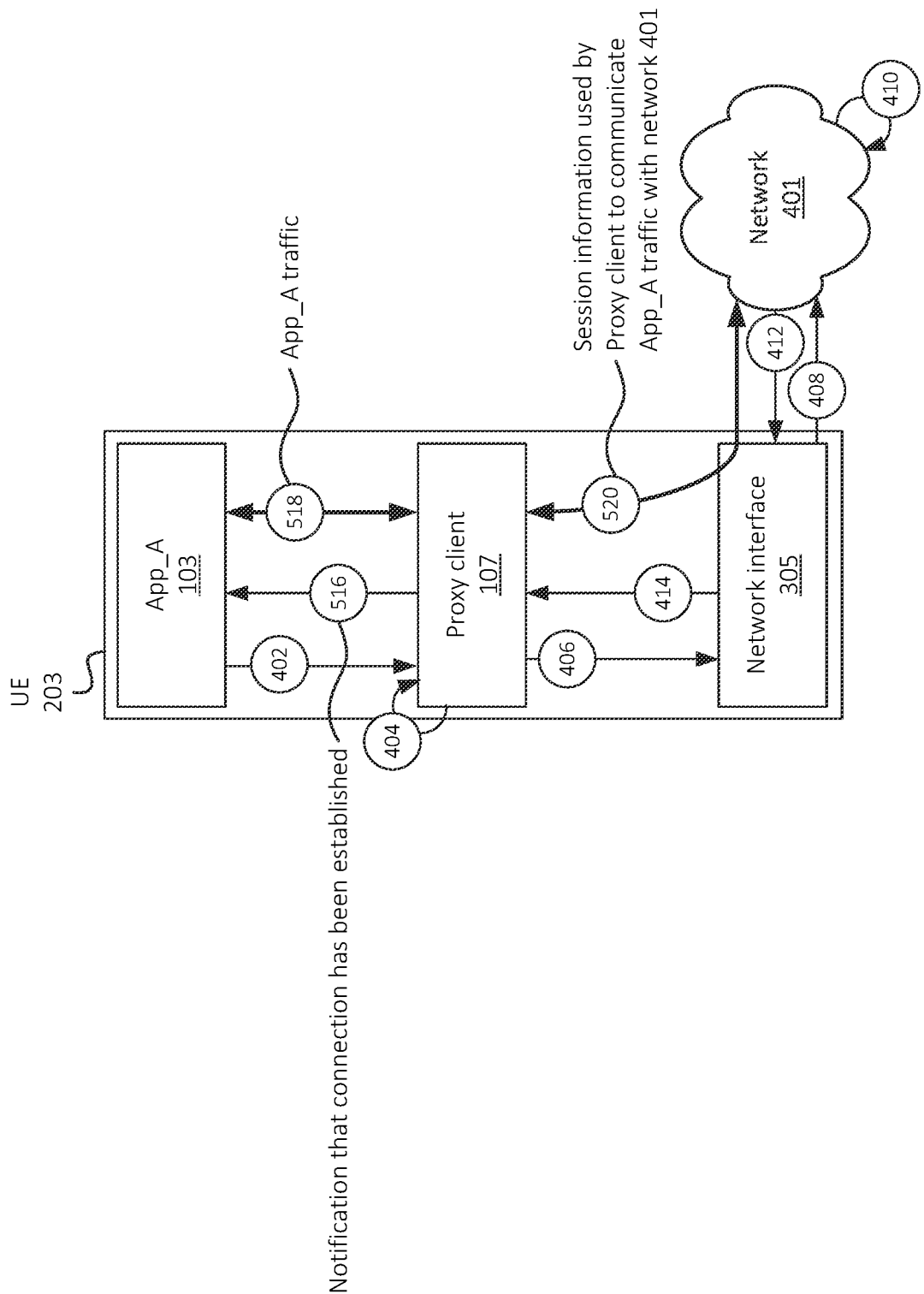

In some embodiments, as shown in FIG. 5, proxy client 107 may maintain the communication session information (received at 414). For example, in such embodiments, proxy client 107 may refrain from providing the communication session information to application 103. As shown, for example, proxy client 107 may provide (at 516) a notification or acknowledgment to application 103, indicating that the requested communication session has been established (e.g., according to the network slice or other traffic parameters requested (at 402) by application 103). Once application 103 receives (at 516) such notification, application 103 may proceed to output (at 518) application traffic to proxy client 107. In some embodiments, such application traffic may be provided with an identifier of Token_A associated with App_A, and/or may be provided with the token itself. In some embodiments, the application traffic may include (e.g., as header information or other information) a hash value or other value derived from or computed based on Token_A. Proxy client 107 may identify the communication session, established (at 408-412) based on the token and/or the value derived or computed therefrom, and may forward (at 520) traffic via the communication session (e.g., associated with the requested network slice and/or otherwise associated with the requested traffic parameters) to network 401.

Figure 6:
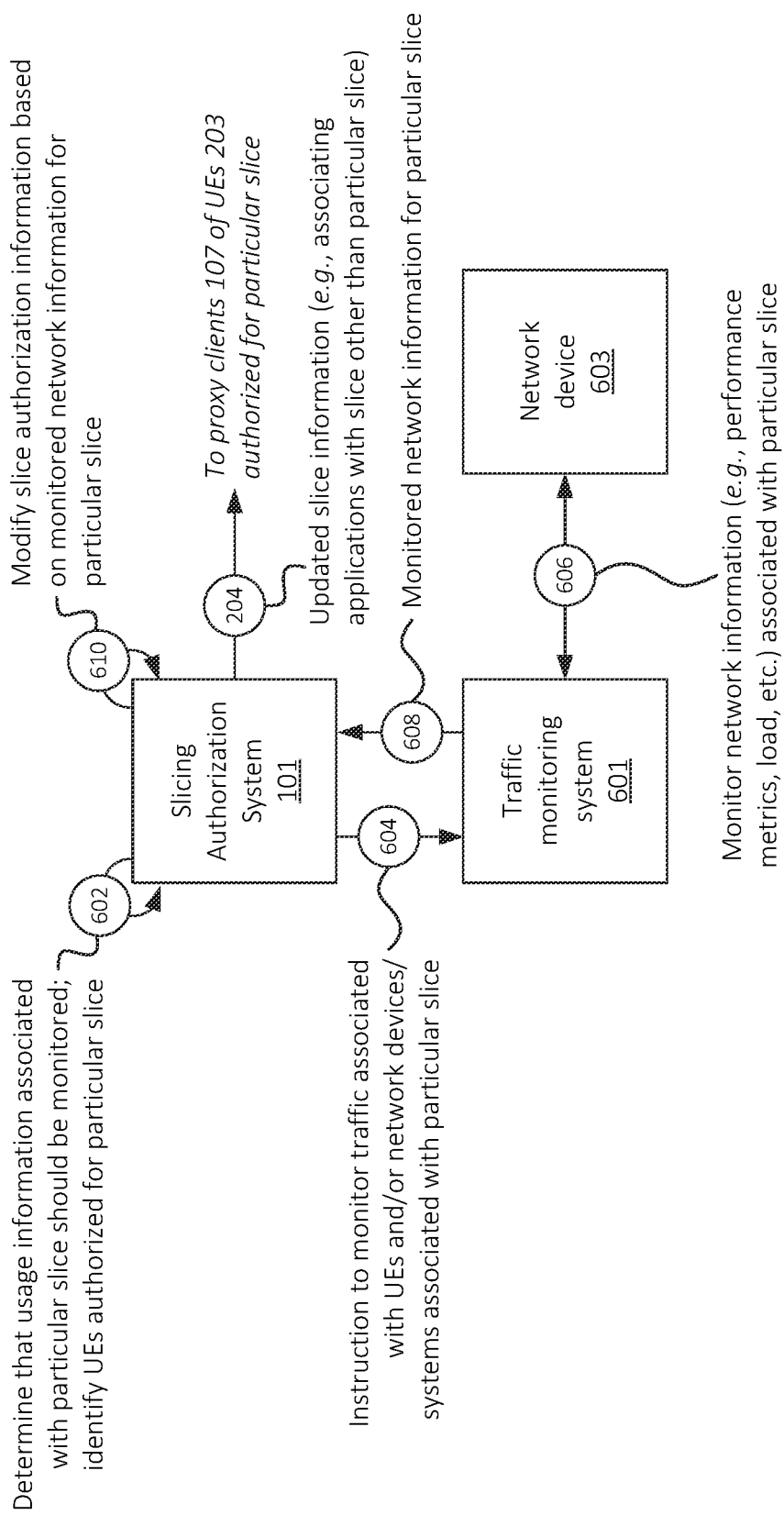
FIG. 6 illustrates an example of monitoring network traffic associated with a given network slice and updating information associating one or more applications with the slice based on the monitoring, in accordance with one or more embodiments described herein.

In some embodiments, SAS 101 may dynamically update instances of proxy client 107 with updated information indicating particular network slices (or other traffic or routing parameters) associated with particular applications 103 and/or application tokens. For example, as shown in FIG. 6, SAS 101 may determine (at 602) that usage information associated with a particular slice should be monitored, such as a particular slice associated with a particular token. Such determination may be based on the issuance or generation of a new token, a periodic interval (e.g., every hour, every day, every week, etc.) after a given token has been issued or generated, a determination that traffic associated with a given network slice exceeds load thresholds, and/or based on some other event or trigger.

In some embodiments, SAS 101 may identify particular UEs 203 that have been authorized to access the particular network slice (e.g., based on information maintained in data structure 201 or some other data structure). SAS 101 may instruct (at 604) traffic monitoring system 601 to monitor traffic associated with the identified UEs 203, and/or to monitor traffic associated with the particular network slice. Traffic monitoring system 601 may be, may include, and/or may be communicatively coupled to one or more devices of network 401 that monitor traffic metrics, such as load metrics, performance metrics, or the like. Traffic monitoring system 601 may be able to identify such metrics on a per-slice basis, a per-UE basis, and/or on some other suitable basis. In some situations, such monitoring may not be on a per-application basis, such as in situations where applications 103 anonymously send and/or receive traffic using techniques described herein.

For example, traffic monitoring system 601 may monitor (at 606) traffic associated with the particular slice, the identified, UEs 203, etc. by communicating with one or more network devices 603 of network 401 that receive, route, process, etc. such traffic. Network devices 603 may include one or more routers, hubs, gateways, network functions (e.g., a UPF, a PGW, etc.), and/or other elements of network 401.

Traffic monitoring system 601 may provide (at 608) the monitored network information, associated with the particular slice and/or UEs 203, to SAS 101. Such information may be provided in the form of raw values, computed values (e.g., averages, means, medians, etc.), scores, and/or some other suitable format. SAS 101 may, in some embodiments, modify (at 610) slice authorization information associated with the particular network slice based on the received monitored information. For example, SAS 101 may determine that one or more performance thresholds are not met with respect to the particular slice, that one or more load metrics are exceeded (e.g., greater than a threshold amount of traffic is sent or received via the particular network slice) with respect to the particular slice, etc. SAS 101 may thus determine that one or more applications 103, that are associated with the particular network slice, should not be associated with the particular network slice. SAS 101 may thus remove the authorization for such applications 103 for the particular network slice, and/or may associate such applications 103 with one or more other network slices. In some embodiments, SAS 101 may remove authorization for such applications 103 by modifying information associating tokens with the particular network slice.

For example, SAS 101 may update some or all of data structure 109, to associate a particular token with a different slice than was previously associated with the token. In other words, SAS 101 may modify such data structure 109 to indicate that UEs 203, presenting the particular token, are no longer authorized to access the network slice previously authorized for such token, and are now authorized to access the network slice that has now been authorized for the token.

SAS 101 may provide (at 204) the updated information to instances of proxy client 107 associated with UEs 203 authorized for the particular slice. For example, as discussed above with respect to FIG. 2, SAS 101 may identify particular UEs 203 that are associated with the particular slice and/or that have installed applications 203 associated with the particular token, and may update (at 204) such instances of proxy client 107 with the updated information. The instances of proxy client 107 may thus proceed to use such information in the manner similarly described above (e.g., to request communication sessions associated with the updated network slice when receiving the token from a given UE 203). As such, SAS 101 may maintain dynamic control of which network slices are able to be used by particular UEs 203, without needing to modify or even identify such UEs 203.

Figure 7:
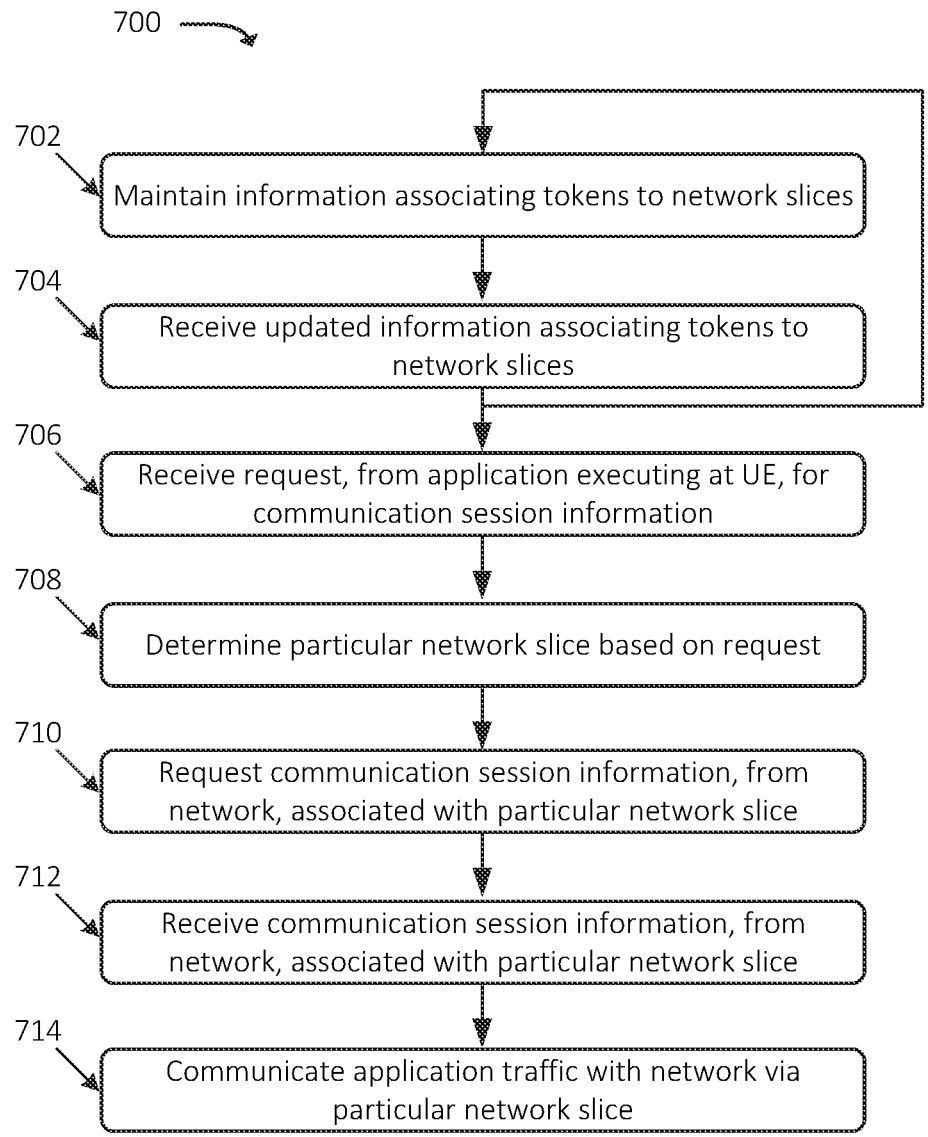
FIG. 7 illustrates an example process for establishing communications according to a particular network slice for traffic associated with a particular application without providing an application identifier to the network, in accordance with one or more embodiments described herein, in accordance with some embodiments.

FIG. 7 illustrates an example process 700 for establishing communications according to a particular network slice for traffic associated with a particular application without providing an application identifier to the network, in accordance with one or more embodiments described herein. In some embodiments, some or all of process 700 may be performed by proxy client 107 (e.g., by a UE 203 executing or running an instance of proxy client 107). In some embodiments, one or more other devices may perform some or all of process 700 in concert with proxy client 107, such as network interface 305 of UE 203, SAS 101, and/or some other device or system.

As shown, process 700 may include maintaining (at 702) information associating tokens to network slices. For example, as discussed above, proxy client 107 may receive registration information or other information associating one or more tokens 105 to one or more network slices. While "network slices" are used herein as an example, in some embodiments, other types of traffic treatment, rules, policies, etc. may be applied to traffic described as being sent or received "via a particular network slice." For example, in networks that do not implement network slices, and/or that provide some other sort of differentiated form of traffic treatment (e.g., different priority levels, different QoS levels, different routing rules, etc.), such differentiated traffic treatment may be included when network slices are discussed herein.

Such tokens 105 may be associated with applications 103 that have been authorized by SAS 101 and/or one or more devices of network 401 to access such network slices. In other words, a particular application 103, that is associated with a particular token that is associated with a particular network slice, may have been authorized by network 401 to access that network slice.

Process 700 may further include receiving (at 704) updated information associating tokens to network slices. For example, proxy client 107 may receive information mapping or associating particular tokens 105 to particular network slices from SAS 101 or some other suitable source on an ongoing basis. SAS 101 may, for example, modify the authorization of particular tokens to access particular network slices, as discussed above, and may provide indications of such modifications to one or more UEs 203 (e.g., UEs 203 that have been authorized to access network slices that are the subject of such modifications).

Process 700 may additionally include receiving (at 706) a request, from an application executing at the UE, for communication session information. For example, as discussed above, proxy client 107 may receive such a request from a particular application 103 that communicates with proxy client 107 via an API or other suitable communication pathway.

Process 700 may also include determining (at 708) a particular network slice based on the request. For example, as discussed above, the request (at 706) may include an explicit indication of a particular network slice and/or may include other parameters, attributes, etc. based on which proxy client 107 and/or some other element of UE 203 (e.g., network interface 305) may identify a particular network slice associated with the request. In some embodiments, the request may include an indication of a maximum threshold latency for communications, and proxy client 107 may identify a network slice, a traffic descriptor, and/or some other identifier. Proxy client 107 may provide the information identifying the network slice, the traffic descriptor, etc. to network interface 305, which may determine a particular network slice associated with the request. For example, network interface 305 may utilize URSP rules, a mapping, one or more functions, etc. to determine a particular network slice for the requested communication session.

For example, in some situations, UE 203 may request a particular network slice and the network slice determined (at 708) may be the same particular network slice requested by UE 203. In other situations, UE 203 may request a set of performance parameters, labels, etc., based on which proxy client 107 and/or network interface 305 may identify a particular network slice for which to request access.

Process 700 may further include requesting (at 710) communication session information, from the network, associated with the particular network slice. For example, proxy client 107 and/or network interface 305 may communicate with one or more network devices of network 401, such as an AMF, an MME, etc. to request a communication session associated with the particular network slice. In some embodiments, network 401 may verify whether UE 203 is authorized to access the particular network slice before establishing the communication session and/or before providing information regarding the requested communication session via the particular network slice. For example, if network 401 determines that UE 203 is authorized to access the requested network slice, network 401 may provide information for a communication session (e.g., a PDU session, a DNN, a traffic flow, etc.) that is associated with the requested network slice. On the other hand, if network 401 determines that UE 203 is not authorized to access the requested network slice, network 401 may provide information for a communication session (e.g., a PDU session, a DNN, a traffic flow, etc.) that is associated with a different network slice from the requested network slice (e.g., a "default" network slice or some other network slice), or may deny the request to establish the communication session.

Process 700 may additionally include receiving (at 712) communication session information, from the network, associated with the particular network slice. For example, network 401 may provide an IP address, a PDU session identifier, a DNN, and/or other indicator of a communication session that is associated with the requested network slice. In some embodiments, proxy client 107 may provide some or all of such information to application 103. In other embodiments, proxy client 107 may refrain from providing some or all of the communication session information to application 103 (e.g., as discussed above).

Process 700 may also include communicating (at 714) application traffic with the network via the particular network slice. For example, UE 203 may communicate traffic, associated with application 103 that requested the communication session, via the particular network slice. For example, application 103 may use the communication session information (e.g., a source IP address or other suitable information) and/or some other element of UE 203 (e.g., proxy client 107 and/or network interface 305) may use the communication session information (e.g., a source IP address, a PDU session identifier, a DNN, etc.) to communicate with network 401 via the particular slice.

Figure 8:
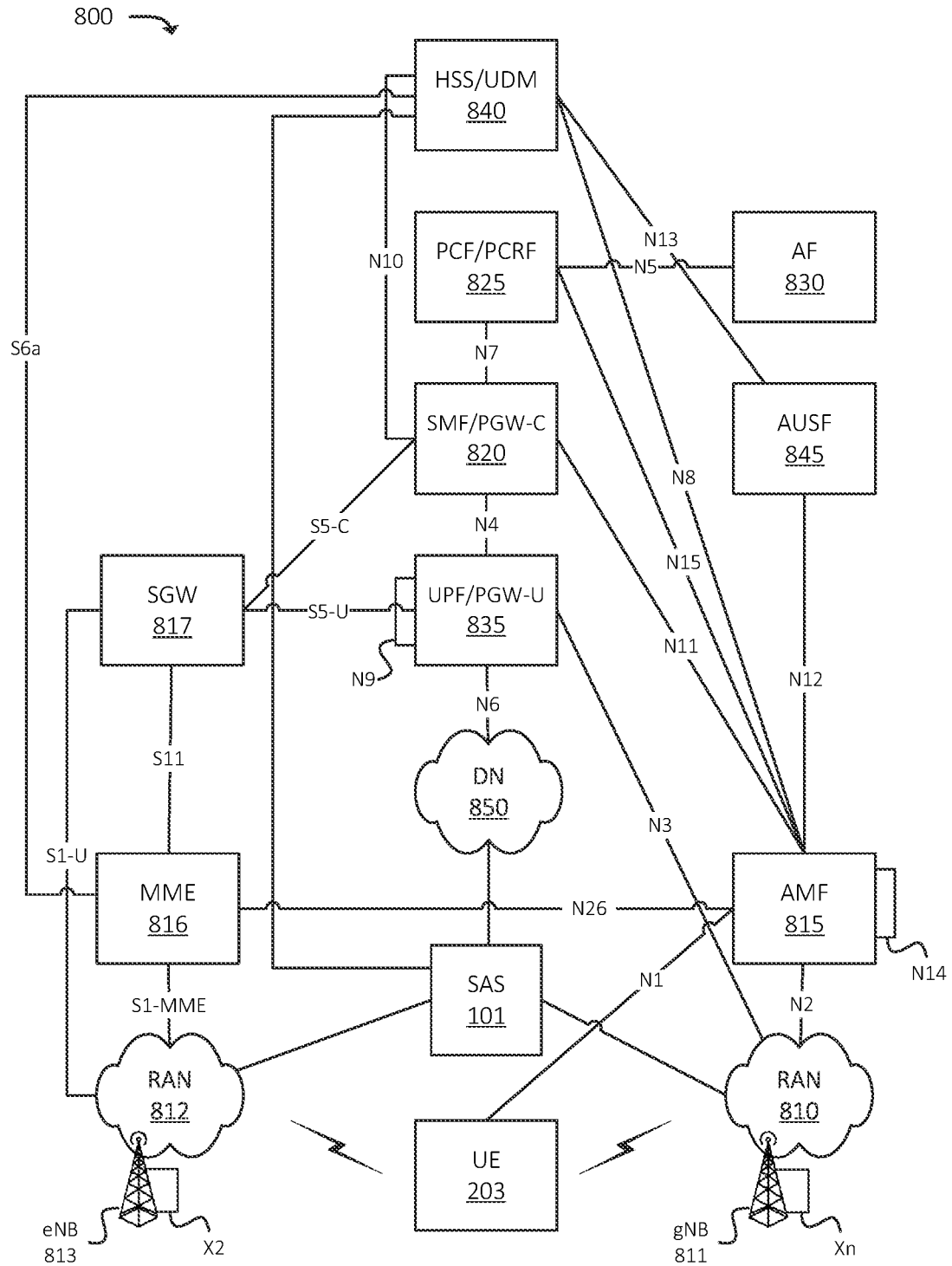
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 203, RAN 810 (which may include one or more Next Generation Node Bs ("gNBs") 811), RAN 812 (which may include one or more evolved Node Bs ("eNBs") 813), and various network functions such as AMF 815, MME 816, SGW 817, SMF/Packet Data Network ("PDN") Gateway ("PGW")-Control plane function ("PGW-C") 820, Policy Control Function ("PCF")/Policy Charging and Rules Function ("PCRF") 825, Application Function ("AF") 830, UPF/PGW-User plane function ("PGW-U") 835, HSS/UDM 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as SAS 101.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800. In some embodiments, network 401 may include, may implement, may be implemented by, and/or may be communicatively coupled to some or all of the elements of environment 800.

UE 203 may include a computation and communication device, such as a wireless mobile communication device that is capable of communicating with RAN 810, RAN 812, and/or DN 850. UE 203 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 203 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 203 may communicate with one or more other elements of environment 800. UE 203 may communicate with RAN 810 via an air interface (e.g., as provided by gNB 811). For instance, RAN 810 may receive traffic (e.g., voice call traffic, data traffic, messaging traffic, signaling traffic, etc.) from UE 203 via the air interface, and may communicate the traffic to UPF/PGW-U 835, and/or one or more other devices or networks. Similarly, RAN 810 may receive traffic intended for UE 203 (e.g., from UPF/PGW-U 835, AMF 815, and/or one or more other devices or networks) and may communicate the traffic to UE 203 via the air interface.

RAN 812 may be, or may include, a LTE RAN that includes one or more base stations (e.g., one or more eNBs 813), via which UE 203 may communicate with one or more other elements of environment 800. UE 203 may communicate with RAN 812 via an air interface (e.g., as provided by eNB 813). For instance, RAN 810 may receive traffic (e.g., voice call traffic, data traffic, messaging traffic, signaling traffic, etc.) from UE 203 via the air interface, and may communicate the traffic to UPF/PGW-U 835, and/or one or more other devices or networks. Similarly, RAN 810 may receive traffic intended for UE 203 (e.g., from UPF/PGW-U 835, SGW 817, and/or one or more other devices or networks) and may communicate the traffic to UE 203 via the air interface.

AMF 815 may include one or more devices, systems, Virtualized Network Functions ("VNFs"), CNFs, etc., that perform operations to register UE 203 with the 5G network, to establish bearer channels associated with a session with UE 203, to hand off UE 203 from the 5G network to another network, to hand off UE 203 from the other network to the 5G network, manage mobility of UE 203 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 203 with the EPC, to establish bearer channels associated with a session with UE 203, to hand off UE 203 from the EPC to another network, to hand off UE 203 from another network to the EPC, manage mobility of UE 203 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 203. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 203, from DN 850, and may forward the user plane data toward UE 203 (e.g., via RAN 810, SMF/PGW-C 820, and/or one or more other devices). In some embodiments, multiple UPFs 835 may be deployed (e.g., in different geographical locations), and the delivery of content to UE 203 may be coordinated via the N9 interface (e.g., as denoted in FIG. 8 by the line marked "N9" originating and terminating at UPF/PGW-U 835). Similarly, UPF/PGW-U 835 may receive traffic from UE 203 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, CNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 203.

DN 850 may include one or more wired and/or wireless networks. For example, DN 850 may include an Internet Protocol ("IP")-based PDN, a wide area network ("WAN")

such as the Internet, a private enterprise network, and/or one or more other networks. UE 203 may communicate, through DN 850, with data servers, other UEs 203, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 203 may communicate.

Figure 9:
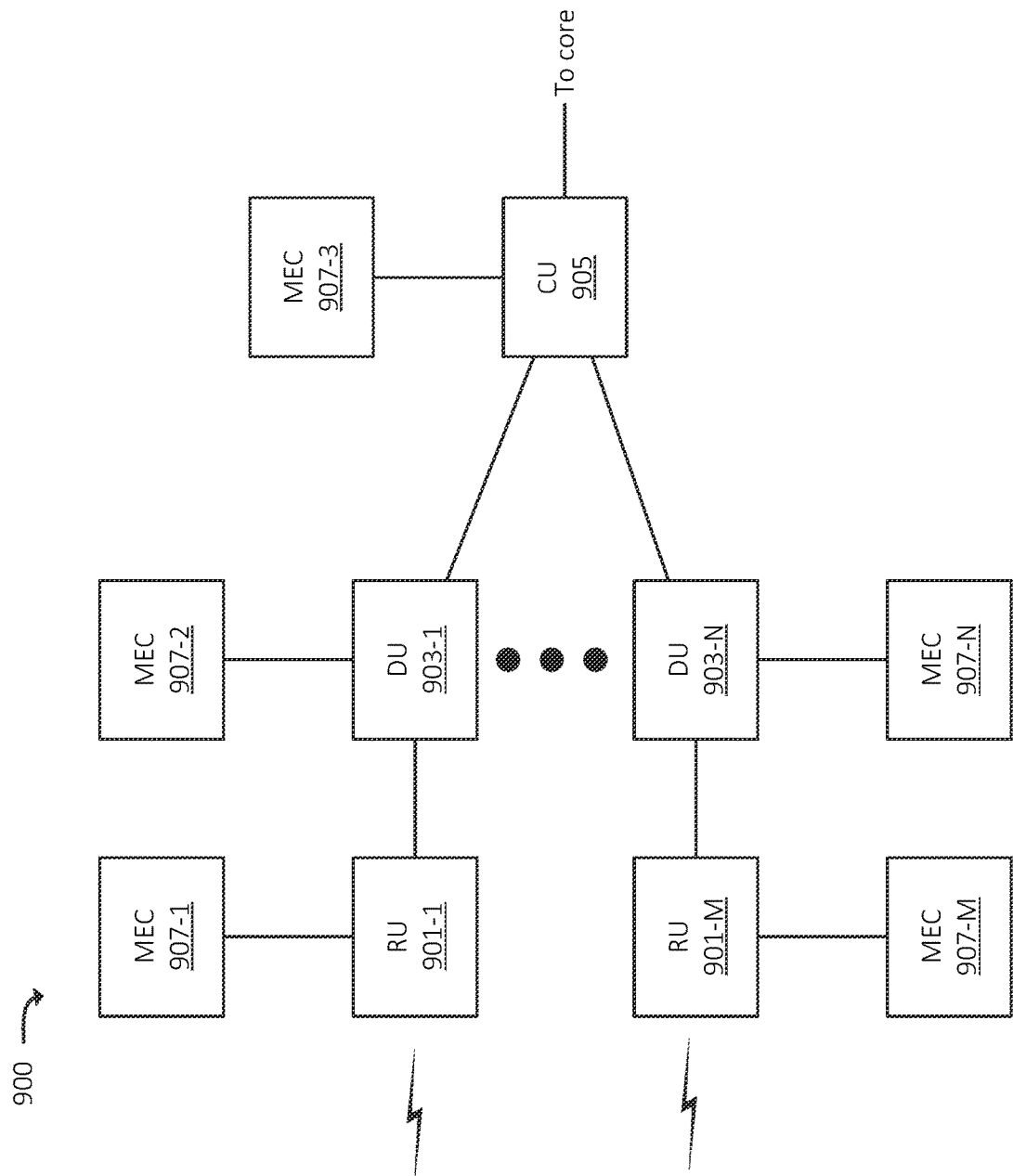
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 203 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 203, and may determine which DU(s) 903 should receive the downlink traffic. DU 903 may include one or more devices that transmit traffic between a core network (e.g., via CU 905) and UE 203 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 203.

RU 901 may include hardware circuitry (e.g., one or more RF transceivers, antennas, radios, and/or other suitable hardware) to communicate wirelessly (e.g., via an RF interface) with one or more UEs 203, one or more other DUs 903 (e.g., via RUs 901 associated with DUs 903), and/or any other suitable type of device. In the uplink direction, RU 901 may receive traffic from UE 203 and/or another DU 903 via the RF interface and may provide the traffic to DU 903. In the downlink direction, RU 901 may receive traffic from DU 903, and may provide the traffic to UE 203 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 203, via a respective RU 901.

For example, RU 901-1 may route some traffic, from UE 203, to MEC 907-1 instead of to a core network (e.g., via DU 903 and CU 905). MEC 907-1 may process the traffic, perform one or more computations based on the received traffic, and may provide traffic to UE 203 via RU 901-1. In this manner, ultra-low latency services may be provided to UE 203, as traffic does not need to traverse DU 903, CU 905, and an intervening backhaul network between DU network 900 and the core network. In some embodiments, MEC 907 may include, may host, and/or may implement, some or all of the functionality described above with respect to UPF 835, SAS 101, and/or one or more other devices, systems, VNFs, CNFs, etc.

Figure 10:
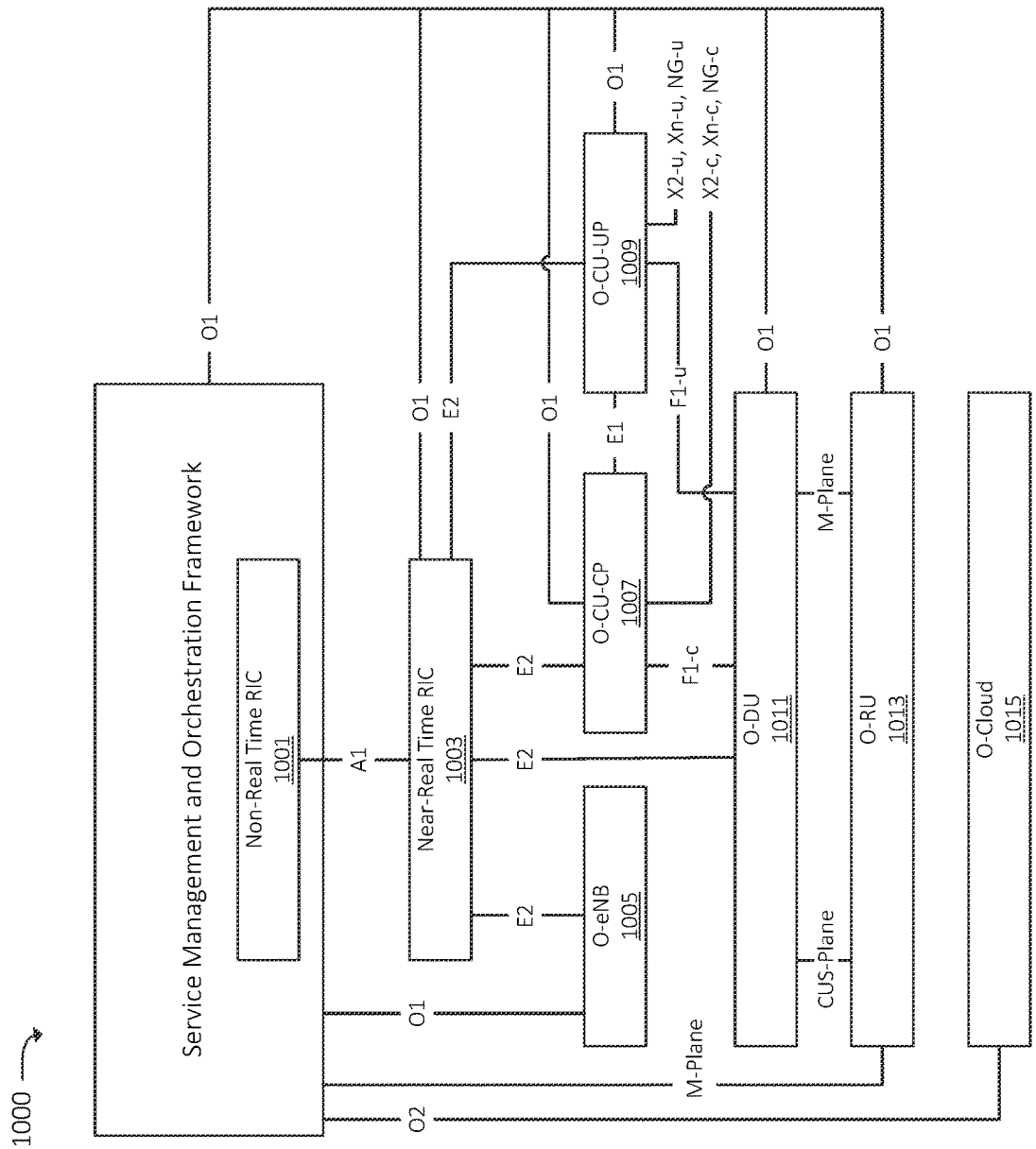
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time MC 1003 may receive performance information (and/or other types of information) from one or more sources, and may configure other elements of O-RAN environment 1000 based on such performance or other information. For example, Near-Real Time MC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 203 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
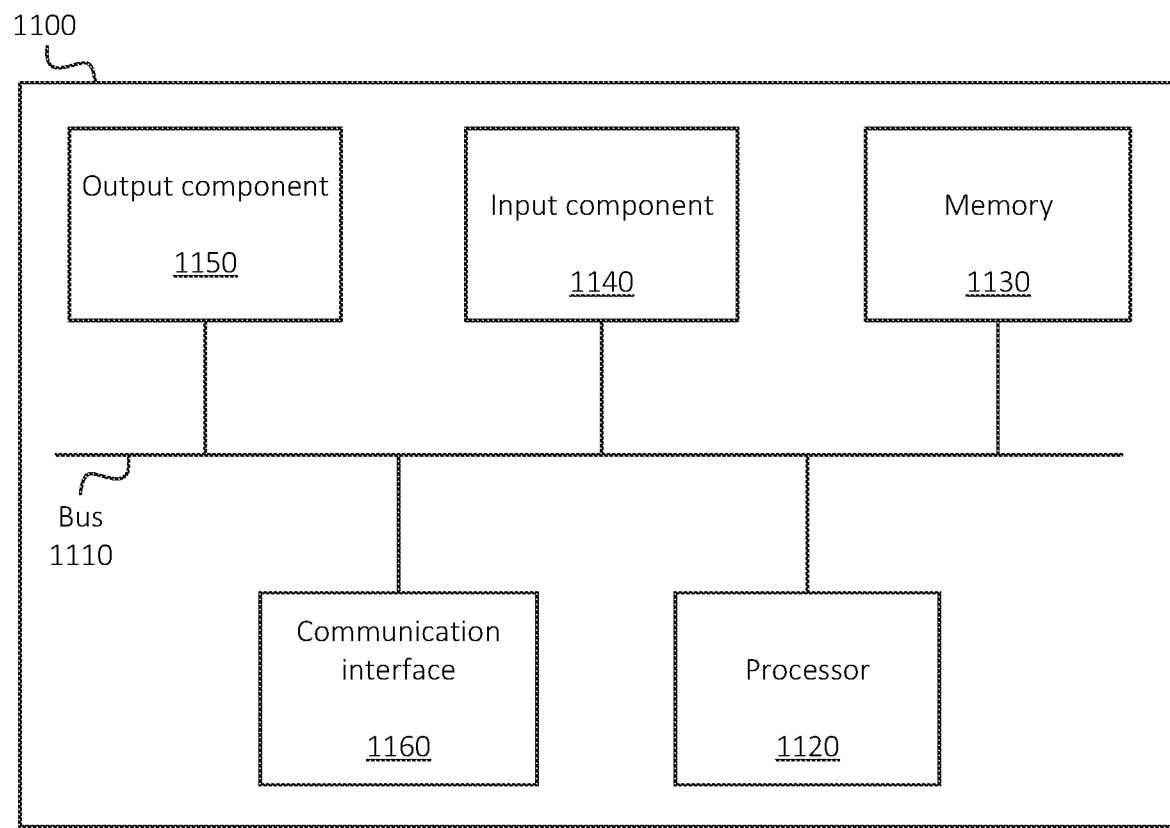
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      maintain information associating one or more tokens to one or more network slices associated with a network;
      receive a set of application resource files that are associated with a particular application, wherein the one or more application resource files include a particular token of the one or more tokens;
      install the application at the device using the set of application resource files;
      execute the application at the device;
      receive a request, from the application executing at the device, for communication session information, wherein the request includes a particular token and does not include an identifier of the application;
      identify a particular network slice associated with the particular token based on the information associating the one or more tokens to the one or more network slices;
      output a request, via an operating system of the device and to the network, to establish a communication session between the device and the network, wherein the request indicates the particular network slice;
      receive communication session information, associated with the particular network slice, from the network in response to the request to establish the communication session that is associated with the particular network slice; and
      provide the communication session information to the application, wherein the application uses the communication session information to communicate with the network via the particular network slice.

2. The device of claim 1, wherein the particular token indicates that the application has been authorized by one or more devices associated with the network to access the particular network slice.

3. The device of claim 1, wherein the one or more processors are further configured to:
   identify one or more User Equipment ("UE") Route Selection Policy ("URSP") rules based on the request from the application,
   wherein identifying the particular network slice associated with the token includes identifying the particular network slice based on the one or more URSP rules.

4. The device of claim 1, wherein the request from the application indicates one or more performance thresholds, wherein identifying the particular network slice includes identifying the particular network slice based on the one or more performance thresholds.

5. The device of claim 1, wherein one or more network devices of the network determine that the device is authorized to access the particular network slice, and output the communication session information based on determining that the device is authorized to access the particular network slice.

6. The device of claim 5, wherein the device is a first User Equipment ("UE") and wherein the communication session information is first communication session information, wherein the one or more network devices further:
   receive a request from a second UE to access the particular network slice,
   determine that the second UE is not authorized to access the particular network slice, and
   output second communication session information to the second UE, the second communication session information being associated with a different network slice.

7. The device of claim 1, wherein the particular application implements a particular application programming interface ("API"), wherein the request is received from the application via the particular API.

8. A non-transitory computer-readable medium, storing a plurality of processor-executable instructions to:
   maintain information associating one or more tokens to one or more network slices associated with a network;
   receive a set of application resource files that are associated with a particular application, wherein the one or more application resource files include a particular token of the one or more tokens;
   install the application at a device using the set of application resource files;
   execute the application at the device;
   receive a request, from the application executing at the device, for communication session information, wherein the request includes a particular token and does not include an identifier of the application;
   identify a particular network slice associated with the particular token based on the information associating the one or more tokens to the one or more network slices;
   output a request, via an operating system of the device and to the network, to establish a communication session between the device and the network, wherein the request indicates the particular network slice;
   receive communication session information, associated with the particular network slice, from the network in response to the request to establish the communication session that is associated with the particular network slice; and provide the communication session information to the application, wherein the application uses the communication session information to communicate with the network via the particular network slice.

9. The non-transitory computer-readable medium of claim 8, wherein the particular token indicates that the application has been authorized by one or more devices associated with the network to access the particular network slice.

10. The non-transitory computer-readable medium of claim 8, wherein the plurality of processor-executable instructions further include processor-executable instructions to:
identify one or more User Equipment ("UE") Route Selection Policy ("URSP") rules based on the request from the application,
wherein identifying the particular network slice associated with the token includes identifying the particular network slice based on the one or more URSP rules.

11. The non-transitory computer-readable medium of claim 8, wherein the request from the application indicates one or more performance thresholds, wherein identifying the particular network slice includes identifying the particular network slice based on the one or more performance thresholds.

12. The non-transitory computer-readable medium of claim 8, wherein one or more network devices of the network determine that the device is authorized to access the particular network slice, and output the communication session information based on determining that the device is authorized to access the particular network slice.

13. The non-transitory computer-readable medium of claim 12, wherein the device is a first User Equipment ("UE") and wherein the communication session information is first communication session information, wherein the one or more network devices further:
receive a request from a second UE to access the particular network slice,
determine that the second UE is not authorized to access the particular network slice, and
output second communication session information to the second UE, the second communication session information being associated with a different network slice.

14. The non-transitory computer-readable medium of claim 8, wherein the particular application implements a particular application programming interface ("API"), wherein the request is received from the application via the particular API.

15. A method performed by a device, the method comprising:
maintaining information associating one or more tokens to one or more network slices associated with a network;
receiving a set of application resource files that are associated with a particular application, wherein the one or more application resource files include a particular token of the one or more tokens;
installing the application at a device using the set of application resource files;
executing the application at the device;
receiving a request, from the application executing at the device, for communication session information, wherein the request includes a particular token and does not include an identifier of the application;
identifying a particular network slice associated with the particular token based on the information associating the one or more tokens to the one or more network slices;
outputting a request, via an operating system of the device and to the network, to establish a communication session between the device and the network, wherein the request indicates the particular network slice;
receiving communication session information, associated with the particular network slice, from the network in response to the request to establish the communication session that is associated with the particular network slice; and
providing the communication session information to the application, wherein the application uses the communication session information to communicate with the network via the particular network slice.

16. The method of claim 15, wherein the particular token indicates that the application has been authorized by one or more devices associated with the network to access the particular network slice.

17. The method of claim 15, the method further comprising:
identifying one or more User Equipment ("UE") Route Selection Policy ("URSP") rules based on the request from the application,
wherein identifying the particular network slice associated with the token includes identifying the particular network slice based on the one or more URSP rules.

18. The method of claim 15, wherein the request from the application indicates one or more performance thresholds, wherein identifying the particular network slice includes identifying the particular network slice based on the one or more performance thresholds.

19. The method of claim 15, wherein the device is a first User Equipment ("UE") and wherein the communication session information is first communication session information, wherein one or more network devices of the network further:
determine that the first UE is authorized to access the particular network slice,
output the communication session information based on determining that the UE is authorized to access the particular network slice,
receive a request from a second UE to access the particular network slice,
determine that the second UE is not authorized to access the particular network slice, and
output second communication session information to the second UE, the second communication session information being associated with a different network slice.

20. The method of claim 15, wherein the particular application implements a particular application programming interface ("API"), wherein the request is received from the application via the particular API.

* * * * *